United States Patent [19]

Johnson

[11] 4,305,811
[45] Dec. 15, 1981

[54] STABILIZED REFORMING CATALYST

[75] Inventor: Marvin F. L. Johnson, Homewood, Ill.

[73] Assignee: Atlantic Richfield Company, Philadelphia, Pa.

[21] Appl. No.: 193,503

[22] Filed: Oct. 2, 1980

[51] Int. Cl.³ .............................................. C01G 35/09
[52] U.S. Cl. .................................. 208/139; 252/441
[58] Field of Search ......................................... 208/139

[56] References Cited

U.S. PATENT DOCUMENTS 3,717,586  2/1973  Suggitt et al. ...................... 208/139
3,977,999  8/1976  Erickson ............................. 208/139
4,124,490  11/1978  Collins et al. ...................... 208/139
4,155,834  5/1979  Gallagher .......................... 208/139
4,159,257  6/1979  Engelhard et al. ................. 208/139

Primary Examiner—Curtis R. Davis
Attorney, Agent, or Firm—John B. Goodman

[57] ABSTRACT

Thermal stability of a halide-promoted, alumina-supported noble metal reforming catalyst is improved by employing an alumina support precursor which comprises at least about 75 weight percent boehmite, having an average crystallite diameter no greater than about 60 Angstroms.

2 Claims, No Drawings

STABILIZED REFORMING CATALYST

BACKGROUND OF THE INVENTION

Catalytic reforming of naphtha fractions has long been regarded as an attractive means for providing gasoline blending components having high octane numbers. The demand for such blending components has become critical as the use of organometallic octane appreciators, such as lead alkyls, has diminished in response to environmental constraints.

Catalytic reforming generally involves a complex series of hydrocarbon reactions, employing a hydrogenation-dehydrogenation catalyst, wherein a substantially paraffinic and/or naphthenic naphtha fraction of petroleum variously undergoes dehydrocyclization, dehydrogenation, isomerization and hydrocracking to provide a mixture substantially comprising aromatic, olefinic naphthenic and isoparaffinic hydrocarbon. Such mixtures possess suitably high octane numbers and generally excellent blending characteristics. The reforming reactions are, on balance, endothermic and are generally conducted with serial flow through a plurality of reactors at elevated temperatures in the presence of hydrogen, with provision for heating between reactor stages.

Noble metal catalysts generally are effective in the promotion of the spectrum of chemical conversions characteristic of reforming. Such metals are quite effective at relatively low concentrations, for example, 1 weight percent or less, when extended upon a support material. Suitable support materials must possess sufficient surface area to provide an adequate base for dispersion of the noble metal. Further, the support must possess pores having dimensions large enough to accommodate the chemical reactants to be acted upon. In general, an adequate surface area for most reactions will be in excess of at least about 100 square meters per gram. For most reforming operations, a generally preferred noble metal is platinum and a preferred support material is alumina. Platinum is often used together with a second metal. Alumina is often modified to increase acidity of the support, as by contacting with a halide-affording material.

Catalysts comprising platinum, such as platinum dispersed on an alumina support, are generally employed in the reforming of naphthas because of their overall excellent performance, despite high cost, and high selectivity toward the production of aromatic hydrocarbons boiling in the gasoline range. Maintenance of platinum catalyst activity and selectivity can be improved by the use of a second metal. A preferred second metal is rhenium, whose use is particularly described in U.S. Pat. Nos. 3,415,737, 3,496,096 and 4,176,088.

Since most of the desirable chemical reactions, including hydroisomerization and dehydrocyclization, require acidic conditions, it is necessary to provide an effective level of acidity in the catalyst. This is generally accomplished by the introduction of a halogen, usually chloride, which is held on the surface of the catalyst support material together with the catalytic metals. The halogen material is replenished throughout the catalytic cycle by addition, usually in the form of an organic halide, to the hydrocarbon feedstock. Control of the halide concentration on the catalyst by control of the water-halide ratio in the feed is well known.

One method for increasing the activity of the reforming catalyst, particularly in terminal reactors, comprises significantly increasing the chloride content in the catalyst, for example, to a level substantially above 1.0 weight percent. However, this approach is often not feasible because loss of catalyst surface area with continuing on-stream time leads to loss of chloride from the catalyst, thus requiring an excessive make-up rate for chloride and causing excessive downstream corrosion.

Although much attention has been given to this problem, there is a continuing need for an improved support material, possessing suitably high and stable surface area and pore size characteristics. A desirably improved support will exhibit a substantially diminished rate of change in desirable surface parameters such as surface area and pore size upon continued exposure to high temperatures. Such increased stability of the support material will effectively reduce the tendency toward a gradual loss of halide promoter.

SUMMARY OF THE INVENTION

This invention relates to a reforming catalyst, having improved catalytic activity and thermal stability, comprising a noble metal, such as platinum, on a support, such as alumina. The catalyst may preferably contain a second metal, such as rhenium, as well as platinum. The alumina support precursor is selected to comprise at least about 75 weight percent boehmite.

This invention further relates to a process for reforming petroleum naphtha, employing a catalyst as described hereinabove. Acidity of the catalyst is maintained by addition of a chloride-affording substance such as an alkyl chloride or polychloride. It has been surprisingly observed that a desired chloride level can be more readily maintained with the catalyst of this invention. For example, a lower chloride make-up rate is required under typical reforming conditions. Additionally, it has been surprisingly found that higher chloride levels can be achieved and maintained, such that higher activity levels can be achieved and maintained.

DESCRIPTION OF THE INVENTION

This invention relates to a reforming catalyst comprising a noble metal on an alumina support, having a surface area typically within the range from about 100 to about 300 m.$^2$/g., wherein the alumina support precursor comprises at least about 75 weight percent boehmite and to a reforming process employing said catalyst. The reforming catalyst preferably includes platinum as the noble metal and may optionally include a second metal, preferably rhenium. In a preferred embodiment, the alumina support material is derived from an alumina precursor comprising at least about 80 weight percent boehmite.

The reforming catalyst of this invention comprises from about 0.3 to about 1.5 weight percent of a noble metal, such as platinum, together with from about 0.3 to about 2.0 weight percent chloride maintained upon the surface of the alumina support. When a second metal, such as rhenium, is also present, such second metal should be present in an amount to provide from about 0.3 to about 1.5 weight percent thereof distributed upon the alumina support material.

The reforming catalyst of this invention desirably comprises from about 0.3 to about 1.0 weight percent of a noble metal such as platinum, preferably about 0.6 weight percent of platinum. Additionally, in bimetallic embodiments of the catalyst, from about 0.3 to about 1.0 weight percent of a second metal is desirably employed, preferably about 0.85 weight percent of rhenium. For effective promotion of the reforming reactions, there is incorporated from about 0.5 to about 2.0 weight percent of a halide, preferably chloride, into the support material, as by addition in the form of an alkyl halide to the naphtha feedstock in a suitable amount. When preferred amounts of platinum and rhenium are present in the catalyst, it has been found that the presence of about 1.4 weight percent chloride provides a particularly desirably promoting effect.

The catalysts of this invention surprisingly maintain the preferred high chloride levels to a degree permitting a much lower chloride make-up rate. This ability to hold chloride also minimizes the stripping effect of moisture on catalyst halide concentration as well as the downstream corrosion problems attributable thereto. Accordingly, the catalysts of this invention permit the ready maintenance of a particular chloride level, with less make-up required, or the achievement of higher chloride levels, or activity levels, than generally realized heretofore. This improvement is accomplished without significant loss of yield.

With the catalyst of this invention, having improved thermal, surface-area stability characteristics under reforming conditions, the initial high activity and selectivity, in the processing of naphtha feedstocks to high-octane number blending components for gasolines, are surprisingly maintained over a substantial period of time, when measured either as cycle length or as the number of process cycles achieved prior to such a loss of catalyst activity as to dictate catalyst replacement. Such catalyst qualities significantly increase the operating efficiency of a naphtha reforming process and the economic production of critical blending stocks.

In seeking means for improving the stability of reforming catalyst supports, it has been found that an alumina precursor in the form of boehmite, a crystalline alumina mono-hydrate, affords surprisingly greater thermal stability than other crystalline forms, such as the tri-hydrates (bayerite, nordstrandite or gibbsite) or than amorphous alumina. One suitable source for boehmite-rich alumina is the product obtained from hydrolysis of the aluminum alkoxide catalyst employed in olefin oligomerization and in alcohol production. This product typically contains at least 75 weight percent and often 80 weight percent or more of boehmite, the remainder customarily being amorphous alumina. Another means for achieving substantially increased boehmite content in an alumina comprises hydrothermal aging of various alumina precursors. Preferred boehmite-rich alumina precursors contain at least about 80 weight percent boehmite and are further characterized in having an average crystallite diameter of up to about 60 Angstroms, preferably at least about 30 Angstroms and no more than about 60 Angstroms, and most preferably within the range from about 30 to about 50 Angstroms. It has been observed that catalysts employing boehmite having larger crystallite dimensions exhibit a lesser degree of surface-area stability, comparable to that observed in catalysts derived from crystalline alumina tri-hydrates or from amorphous alumina.

Suitable catalyst support materials include any alumina having the requisite content of boehmite. In preparation of the support material for conventional impregnation with platinum and/or other metals, the alumina is customarily formed into a mull or paste with water, extruded and calcined under selected conditions. Such operations may be repeated if desired.

The catalyst of this invention is conveniently employed under generally conventional reforming conditions. Typically a virgin naphtha, boiling generally in the range from about 200° to about 450° F., is processed at reaction temperature within the range from about 850° to about 1050° F., in the presence of hydrogen at process pressures ranging from about 100 to about 700 psig. A series of reactors is customarily employed with provision for reheating between stages. Process hydrogen is recycled in part and the liquid product can be fractionated to provide the desired reformate blending stock.

The following procedures and tests are exemplary, without limitation, of the catalysts of this invention.

EXAMPLE A

An alumina support material, comprising 52 weight percent boehmite and having an average crystallite diameter of 34 Angstroms, as a powder, was blended with water to provide a thick paste. Mixing was further carried out in a muller with the addition of water as required to provide an extrudable mixture. After mulling for 30 minutes, the mixture was extruded through a die plate having 1/6-inch diameter holes. After drying 12 hours in a forced air drying oven at 125° C., the extrudate was broken into small particles and calcined for 2 hours at 300° F. furnace temperature. Temperature was then raised to 950° F., at a rate of 300° F./hour, and maintained for 3 hours. During calcination, dry air was passed through the oven at 1000 VHSV.

The calcined extrudate particles were impregnated with a solution (0.75 ml./g.) containing chloroplatinic acid, perrhenic acid and hydrochloric acid in amounts calculated to provide 0.35 weight percent platinum, 0.35 weight percent rhenium, and 1.4 weight percent chloride in the finished catalyst. The volume of solution was selected to be slightly greater than the pore volume of the extrudate particles. A final calcination was carried out as before.

EXAMPLE B

An alumina support material, comprising 82 weight percent boehmite and having an average crystallite diameter of 45 Angstroms as a powder, was blended with sufficient dilute (2 volume percent) nitric acid to partially peptize the alumina and with sufficient water to provide a thick paste. Mixing was further carried out in a muller with the addition of water as required to provide an extrudable mixture. After mulling for 30 minutes, the mixture was extruded through a die plate having 1/6-inch diameter holes. After drying 12 hours in a forced air drying oven at 125° C., the extrudate was broken into small particles and calcined for 2 hours at 300° F. furnace temperature. Temperature was then raised to 950° F., at a rate of 300° F./hour, and maintained for 3 hours. During calcination, dry air was passed through the oven at 1000 VHSV.

The calcined extrudate particles were impregnated with a solution (0.75 ml./g.) containing chloroplatinic acid, perrhenic acid, and hydrochloric acid in amounts calculated to provide 0.6 weight percent platinum, 0.85 weight percent rhenium, and 1.4 weight percent chloride in the finished catalyst. The volume of solution was selected to be slightly greater than the pore volume of the extrudate particles. A final calcination was carried out as before

EXAMPLE C

An amorphous alumina was employed to prepare a catalyst under the conditions set forth in EXAMPLE A with the exception that the mulled catalyst mass was not extruded, but dried to provide a granular material.

The relative surface area stability of the catalyst were determined by holding the above catalyst samples at 1100° F. in flowing air, containing 1.4–1.5 psia water to accelerate loss of surface area. Samples were withdrawn at various times over a run length of up to 550 hours. Data were analyzed to provide surface area data for an included run length of 400 hours and for an extrapolated run length of $10^4$ hours. The standard deviation of the average area is approximately 2 m$^2$/g. The relative surface area stability data are presented in TABLE I.

TABLE I

| | SURFACE AREA STABILITY TEST | | | |
|---|---|---|---|---|
| | Alumina Precursor | | Area (m.$^2$/g.) | |
| Example | Boehmite, wt % | Crystallite Diameter, Angstroms | 400 hrs | $10^4$ hrs |
| A | 52 | 34 | 140 | 113 |
| B | 82 | 45 | 157 | 127 |
| C | 0 | — | 126 | 101 |

Based on correlations with commercial testing, a difference of 14 m.$^2$/g., as between EXAMPLES A and B in TABLE I, above, corresponds to the difference between 5.5 and 7.5 cycles, or about 35% greater stability.

What is claimed is:

1. A process for reforming a naphtha fraction, which comprises contacting the naphtha fraction under reforming conditions and in the presence of hydrogen with a reforming catalyst, comprising an alumina support, derived from an alumina precursor, having distributed thereon from about 0.3 to about 1.5 weight percent platinum, from about 0.3 to about 1.5 weight percent rhenium, and from about 0.3 to about 2.0 weight percent chloride, wherein the precursor of the alumina support comprises at least about 75 weight percent boehmite, the average crystallite diameter of the boehmite being within the range from about 30 to about 60 Angstrom units.

2. The process of claim 1 wherein the catalyst comprises about 0.6 weight percent platinum, about 0.85 weight percent rhenium, and about 1.4 weight percent chloride and the alumina support precursor comprises at least about 80 weight percent boehmite, the average crystallite diameter of the boehmite being within the range from about 30 to about 50 Angstrom units.

* * * * *